Jan. 26, 1937.  W. AMOS  2,068,728
SOLDERING IRON
Filed Aug. 9, 1935
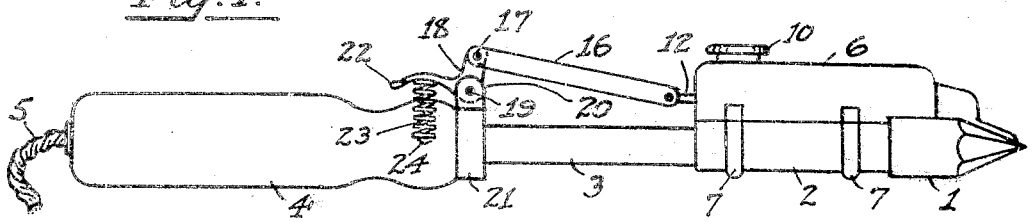
Fig. 1.
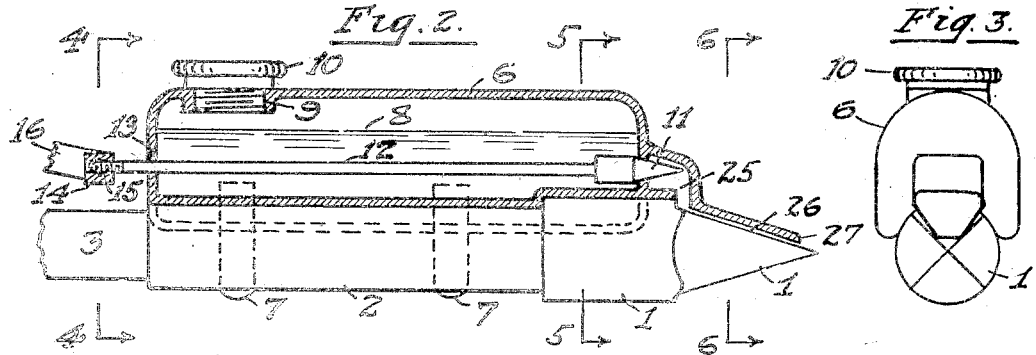
Fig. 2.  Fig. 3.
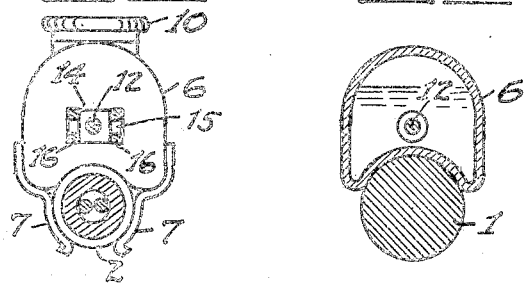
Fig. 4.  Fig. 5.  Fig. 6.
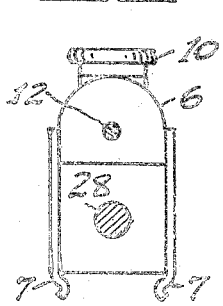
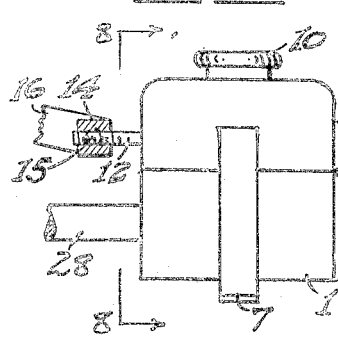
Fig. 8.  Fig. 7.  Fig. 9.
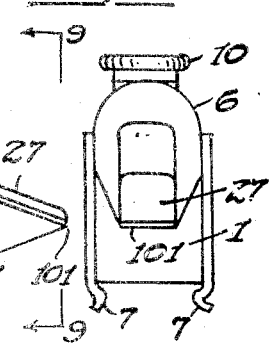
INVENTOR—
William Amos Patented Jan. 26, 1937

2,068,728

UNITED STATES PATENT OFFICE 2,068,728

SOLDERING IRON

William Amos, Detroit, Mich.

Application August 9, 1935, Serial No. 35,511

6 Claims. (Cl. 113—109)

My invention relates to soldering irons, and its principal object is to provide means whereby a continuous supply of molten solder is available at all times at the point of the soldering iron or "bit", without the necessity of applying solder to the same from time to time as is the case with soldering irons of ordinary construction.

I am aware that electric soldering irons have been hitherto constructed in which are provided a reservoir for melted solder and also built-in means for heating the solder to the required temperature, but such soldering irons are of necessity complicated in construction and expensive to manufacture.

According to my present invention I have provided a simple and cheap device which can quickly and easily be applied to any ordinary soldering iron, either electric or otherwise, so that all the advantages of the more elaborate devices are obtained with a minimum expense.

In order that the nature of my invention may be readily understood, I will now describe a preferred embodiment of the same with reference to the accompanying drawing, in which—

Figure 1 is a side elevation showing my invention as applied to an electric soldering iron of conventional type.

Figure 2 is a central vertical section of the same drawn to an enlarged scale, showing the essential features of my invention.

Figure 3 is an end view of the same.

Figure 4 is a section on line 4—4 of Figure 2.

Figure 5 is a section on line 5—5 of Figure 2.

Figure 6 is a section on line 6—6 of Figure 2.

Figure 7 is a side elevation showing my invention as applied to a soldering iron of the externally heated type.

Figure 8 is a section on line 8—8 of Figure 7, and

Figure 9 is a section on line 9—9 of Figure 7.

Like characters designate corresponding parts throughout the several views.

1 is the bit, or soldering iron proper, provided with the body 2 containing the electric heating element, and 3 is the stem, of hollow construction containing the electric conductors which pass through the handle 4 and are connected by the usual flexible cable 5 to a source of electric current, in the manner well known in the art.

6 is a hollow chamber or reservoir, made of aluminum or other metal or alloy to which molten solder will not adhere, and 7, 7 are resilient clips by which the reservoir is secured to the body 2.

The reservoir 6 is so formed as to fit closely around the body 2 so as to absorb heat from the same and to maintain the solder 8 in a constantly liquid condition, while an opening 9 having a closure plug 10 serves to retain the molten metal within the reservoir. Within the forward end of the reservoir, and proximate to the bit 1, is a conical valve 11 having a stem 12 which extends rearwardly through an opening 13 in the reservoir and is provided with a collar 14 secured thereupon. The collar 14 has trunnions 15 which are connected by links 16, the rear ends of which engage a pivot pin 17 upon the lever 18. The lever 18, oscillably mounted upon a pin 19 supported in lugs 20 attached to or formed integral with the ferrule 21 of the handle 4, has a thumb lever 22, and beneath the lever is a helical compression spring 23, positioned within a cavity 24 in the handle, the arrangement being such that pressure of the thumb of the operator upon the lever 22 will cause the valve 11 to be removed from its seat and allow molten solder to flow outwards into the space 25 and thence through a narrow space 26 between the extension 27 upon the reservoir and the upper surface of the bit 1, whereby the required amount of solder may be fed to the working end of the bit. Upon release of the lever 22 the valve 11 is closed by the action of the spring 23 so as to shut off the supply of solder, as will be understood.

Referring now to Figures 7, 8 and 9 of the drawing which illustrate the application of my invention to a common soldering iron, 1 is the bit of square cross section having a chisel edge 101, the bit in this case being connected by the round rod 28 to any type of handle, not shown. In this construction the reservoir 6, provided with the closure member 10, is secured to the bit 1 by one pair of resilient clips 7, and has at its forward end an extension 27 similar to that above described with referenec to Figures 1 to 6. The reservoir 6 is provided with a valve and operating mechanism for the same of similar construction to that above described, the only difference being that in this modification the heat applied to the bit 1, derived from a gas burner or other well known means, is at the same time transmitted to the reservoir 6 so as to melt the solder contained therein which is applied to the working point of the iron in the same manner as that hitherto explained.

It will be observed from the foregoing description and by reference to the drawing that I have provided a device which is economical to manufacture and which may be easily and quickly applied to any commercial soldering iron either of the electric or externally heated type, and while I have herein described and illustrated a preferred embodiment of my said invention, it will be readily understood that the same may be modified in various ways to meet any particular or peculiar requirement, without departing from the spirit of my invention as defined in the appended claims. For example, while my invention is primarily designed for use with metallic solder, it may obviously be used in connection with other fastening mediums or cements which require heat for their proper application. In such cases the reservoir may be constructed of material other than those above specified.

Having thus described my said invention, what I claim and desire to secure by Letters Patent of the United States is:

1. A solder reservoir adapted to be secured to a soldering iron outside of its periphery and having its adjacent surface in contact with said periphery in such manner as to receive heat therefrom, said reservoir having a discharge opening adjacent the point of said iron and having an integral apron adapted to over-lie said point and arranged in spaced relation therewith to provide a narrow orifice therebetween through which molten metal issuing from said orifice is directed upon the work-piece.

2. In a device of the character described, the combination, with a solder reservoir adapted to be secured to a soldering iron outside of its periphery and having its adjacent surface in contact with said periphery in such manner as to receive heat therefrom, of an auxiliary chamber adjacent the point of said iron, an opening connecting said reservoir and said chamber, and an apron integral with said reservoir adapted to overlie said point and arranged in spaced relation therewith to provide a narrow orifice through which molten metal issuing from said chamber is directed upon the work-piece.

3. In a device of the character described, the combination, with a solder reservoir adapted to be secured to a soldering iron outside of its periphery and having its adjacent surface in contact with said periphery in such manner as to receive heat therefrom, of an auxiliary chamber adjacent the point of said iron, a valve-controlled opening connecting said reservoir and said chamber, and an apron integral with said reservoir adapted to over-lie said point and arranged in closely spaced relation therewith to provide a narrow orifice therebetween through which molten metal issuing from said chamber is conducted by capillary means to the work-piece.

4. A solder reservoir adapted to be secured to the cylindrical body of a soldering iron outside of its periphery and having its adjacent surface of hollow arcuate form so as to make contact with said periphery throughout a considerable portion of its surface in such manner as to receive heat therefrom, said reservoir having a discharge opening adjacent the point of said iron.

5. A solder reservoir adapted to be secured to the cylindrical body of a soldering iron outside of its periphery and having its adjacent surface of hollow arcuate form so as to make contact with said periphery throughout a considerable portion of its surface in such manner as to receive heat therefrom, said reservoir having a discharge opening adjacent the point of said iron and having an integral apron adapted to over-lie said point and arranged in spaced relation therewith to provide a narrow orifice therebetween through which molten metal issuing from said orifice is directed upon the work-piece.

6. In a device of the character described, the combination, with a solder reservoir of the kind described in claim 4, of a pair of resilient clips secured to said reservoir and having their ends bent in arcuate form and arranged in spaced relation whereby said reservoir may be yieldingly held in contact with the iron.

WILLIAM AMOS.